US009902015B2

(12) United States Patent
Zimmerman

(10) Patent No.: US 9,902,015 B2
(45) Date of Patent: Feb. 27, 2018

(54) MULTIPLE WIRE ELECTRON BEAM MELTING

(71) Applicant: United Technologies Corporation, Hartford, CT (US)

(72) Inventor: Benjamin J. Zimmerman, Moseley, VA (US)

(73) Assignee: United Technologies Corporation, Farmington, CT (US)

( * ) Notice: Subject to any disclaimer, the term of this patent is extended or adjusted under 35 U.S.C. 154(b) by 117 days.

(21) Appl. No.: 14/770,374

(22) PCT Filed: Feb. 25, 2014

(86) PCT No.: PCT/US2014/018361
§ 371 (c)(1),
(2) Date: Aug. 25, 2015

(87) PCT Pub. No.: WO2014/134055
PCT Pub. Date: Sep. 4, 2014

(65) Prior Publication Data
US 2016/0016253 A1 Jan. 21, 2016

Related U.S. Application Data

(60) Provisional application No. 61/769,604, filed on Feb. 26, 2013.

(51) Int. Cl.
*B23K 15/00* (2006.01)
*B33Y 10/00* (2015.01)
(Continued)

(52) U.S. Cl.
CPC ........ *B23K 15/0086* (2013.01); *B23K 15/002* (2013.01); *B23K 15/0006* (2013.01);
(Continued)

(58) Field of Classification Search
CPC ............ B23K 15/0086; B23K 15/0006; B23K 15/002; B33Y 10/00
(Continued)

(56) References Cited

U.S. PATENT DOCUMENTS 3,665,143 A * 5/1972 Ujiie ...................... B23K 9/046
219/73
6,143,378 A 11/2000 Harwell et al.
(Continued)

FOREIGN PATENT DOCUMENTS

CN 102655975 A 9/2012
CN 102785020 A 11/2012
(Continued)

OTHER PUBLICATIONS

M.B. Taminger Karen et al.: "Characterization of 2219 Aluminum Produced by Electron Beam Freeform Fabrication", Solid Freeform Fabrication Proceedings, Aug. 7, 2002, pp. 1-8.
(Continued)

*Primary Examiner* — Samuel M Heinrich
(74) *Attorney, Agent, or Firm* — O'Shea Getz P.C.

(57) ABSTRACT

An additive manufacturing system includes an electron beam gun with a multiple of independent wire feeders and a beam control system operable to control the electron beam gun and the multiple of independent wire feeders to maintain a multiple of melt pools to fabricate a three-dimensional workpiece.

9 Claims, 1 Drawing Sheet

(51) Int. Cl.
*B33Y 30/00* (2015.01)
*B33Y 70/00* (2015.01)

(52) U.S. Cl.
CPC ............ *B33Y 10/00* (2014.12); *B33Y 30/00* (2014.12); *B33Y 70/00* (2014.12)

(58) Field of Classification Search
USPC ............ 219/121.13, 121.14, 121.16, 121.17, 219/121.35; 264/497
See application file for complete search history.

(56) References Cited

U.S. PATENT DOCUMENTS

| | | |
|---|---|---|
| 2007/0087027 A1 | 4/2007 | Greenhalgh et al. |
| 2010/0260410 A1 | 10/2010 | Taminger et al. |
| 2011/0114839 A1 | 5/2011 | Stecker et al. |
| 2011/0208304 A1 | 8/2011 | Justin et al. |
| 2011/0240607 A1 | 10/2011 | Stecker et al. |
| 2011/0293840 A1 | 12/2011 | Newkirk et al. |
| 2011/0297658 A1* | 12/2011 | Peters .................. B23K 9/02 219/162 |
| 2012/0193335 A1 | 8/2012 | Guldberg |
| 2013/0055568 A1* | 3/2013 | Dusel .................. B22F 3/1055 29/888.02 |

FOREIGN PATENT DOCUMENTS

| | | |
|---|---|---|
| GB | 2440727 A | 2/2008 |
| JP | 2005054197 A | 3/2005 |

OTHER PUBLICATIONS

EP search report for EP14757198.8 dated Aug. 10, 2016.
Office action for CN201480010676.7 dated Jan. 17, 2017.
"Aeronautic Welding International Forum Essays", China Mechanical Engineering Society and Affiliated Welding Society, pp. 34-35, China Machine Press, Nov. 30, 2004.
Chinese office action for CN201480010676.7 dated Sep. 13, 2017.
Office action for JP2015-559273 dated Nov. 28, 2017.

* cited by examiner

MULTIPLE WIRE ELECTRON BEAM MELTING

This application claims priority to PCT Patent Appln. No. PCT/US14/18361 filed Feb.25,2014, which claims priority to U.S. Patent Appln. No. 61/769,604 filed Feb.26.2013.

BACKGROUND

The present disclosure relates to additive manufacturing and, more particularly, to solid freeform fabrication of objects employing electron beam energy.

An electron beam welding-like approach for additive manufacturing utilizes a high-power Electron Beam (EB) gun and a spool of wire to very quickly builds up large parts. The process, however, does not lend itself to small features and the large melt pool leads to a relatively slow cooling rate and relatively larger grain sizes.

A powder bed approach for additive manufacturing is a relatively slow, low power process with a stationary gun and powder material. Build rates are relatively slow, but fine features are possible and some mechanical properties are improved due to the smaller pool size and faster cooling rates.

SUMMARY

An additive manufacturing system according to one disclosed non-limiting embodiment of the present disclosure includes an electron beam gun. A multiple of independent wire feeders and a beam control system operable to control the electron beam gun and the multiple of independent wire feeders to maintain a multiple of melt pools to fabricate a three-dimensional workpiece.

A further embodiment of the present disclosure includes, wherein the electron beam gun provides a beam power in the range of from about 3 to about 60 kW.

A further embodiment of any of the foregoing embodiments of the present disclosure includes, wherein at least one of the multiple of independent wire feeders provide a wire diameter greater than about 0.002" (0.05 mm) in diameter.

A further embodiment of any of the foregoing embodiments of the present disclosure includes, wherein each of the multiple of independent wire feeders are operable to feed a respective wire into any location within a predefined fraction of a build envelope.

A further embodiment of any of the foregoing embodiments of the present disclosure includes, wherein the beam control system is operable to control the electron beam gun to direct a beam into the build element.

A method of additive manufacturing according to another disclosed non-limiting embodiment of the present disclosure includes maintaining a multiple of melt pools to fabricate a three-dimensional workpiece.

A further embodiment of any of the foregoing embodiments of the present disclosure includes feeding a wire from each of a multiple of independent wire feeders into any location within a predefined fraction of a build envelope.

A further embodiment of any of the foregoing embodiments of the present disclosure includes directing a beam from an electron beam gun into any location within a predefined fraction of a build envelope.

A further embodiment of any of the foregoing embodiments of the present disclosure includes simultaneously maintaining a multiple of melt pools to fabricate the three-dimensional workpiece.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
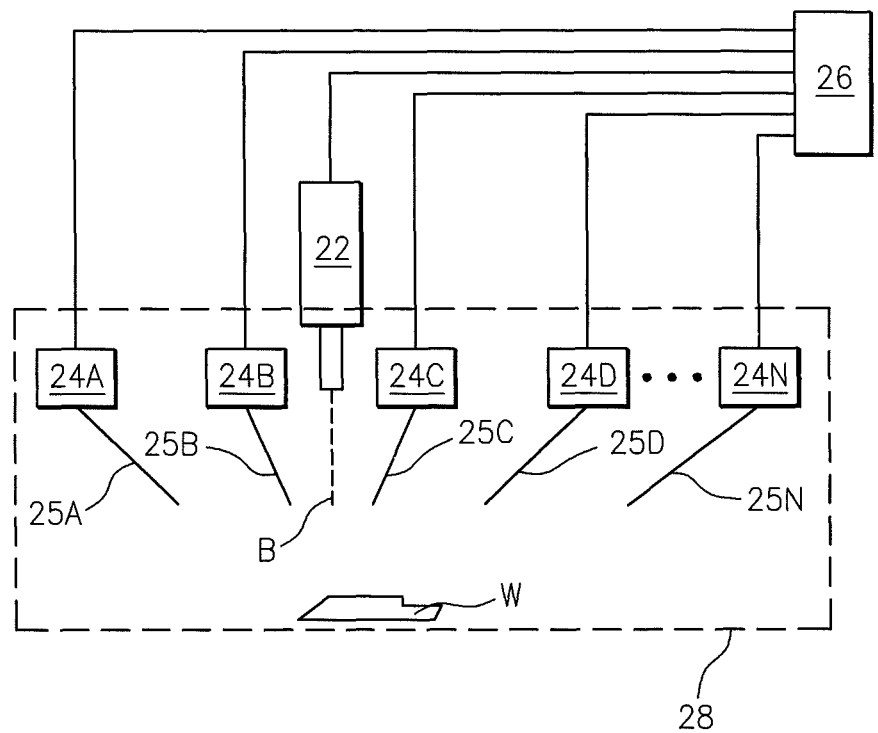
FIG. 1 is a schematic block diagram of an additive manufacturing system.

FIG. 1 schematically illustrates an additive manufacturing system 20. The system 20 generally includes an electron beam gun 22, a multiple of independent wire feeders 24A-24n and a beam control system 26 operable to maintain a multiple of melt pools to fabricate a three-dimensional workpiece W.

In one disclosed non-limiting embodiment, the electron beam gun 22 generates a focusable electron beam B with a beam power in the range of from about three (3) to about sixty (60) kW. The beam control system 26 is operable to control the electron beam gun 22 within a build envelope 28 to maintain a multiple of melt pools PA-Pn to fabricate a three-dimensional workpiece W.

The multiple of independent wire feeders 24A-24n may provide a multiple of wire diameters great than about 0.002" (0.05 mm) in diameter. The multiple of independent wire feeders 24A-24n are each capable of feeding their respective wire 25A-25n into any location within a predefined fraction of the build envelope 28.

In one disclosed non-limiting embodiment, the system 20 maintains the multiple of melt pools on a single horizontal plane, and the workpiece W would continuously lower, as in a powder bed approach. The high power electron beam gun 22 and the multiple of independent wire feeders 24A-24n would be stationary. Alternately, the workpiece W remains stationary, but an extra degree of freedom is provided to the high power electron beam gun 22 and the multiple of independent wire feeders 24A-24n.

Figure 2:
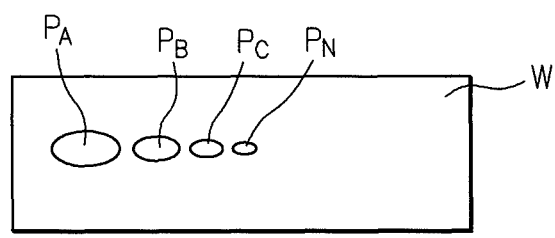
FIG. 2 is a schematic view of a workpiece with multiple meltpools.

The system 20 facilitates the formation of small features yet increases the build rate due to the maintenance of multiple melt pools PA-Pn (FIG. 2). The multiple melt pools PA-Pn also improve the microstructure of the workpiece W due to the potential for smaller melt pool size and thus more rapid cooling. The wire feedstock from the multiple of independent wire feeders 24A-24n is also relatively less expensive than powder.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An additive manufacturing system, comprising:
   an electron beam gun;
   a multiple of independent wire feeders; and
   a beam control system operable to control said electron beam gun and said multiple of independent wire feeders to maintain a multiple of melt pools to fabricate a three-dimensional workpiece.

2. The system as recited in claim 1, wherein said electron beam gun provides a beam power in the range of from about three (3) to about sixty (60) kW.

3. The system as recited in claim 1, wherein at least one of said multiple of independent wire feeders provides a wire diameter greater than about 0.002" (0.05 mm) in diameter.

4. The system as recited in claim 1, wherein each of said multiple of independent wire feeders are operable to feed a respective wire into any location within a predefined fraction of a build envelope.

5. The system as recited in claim 4, wherein said beam control system is operable to control said electron beam gun to direct a beam into said build envelope.

6. A method of additive manufacturing comprising:
   feeding a wire from each of a multiple of independent wire feeders into any location within a predefined fraction of a build envelope;
   directing a beam from an electron beam gun into any location within a predefined fraction of a build envelope; and
   maintaining a multiple of melt pools to fabricate a three-dimensional workpiece.

7. The method as recited in claim 6, further comprising controlling operation of said electron beam gun and said multiple of independent wire feeders to maintain said multiple of melt pools to fabricate said three-dimensional workpiece.

8. The method as recited in claim 6, wherein said electron beam gun provides a beam power in the range of from about three (3) to about sixty (60) kW.

9. The method as recited in claim 6, wherein at least one of said multiple of independent wire feeders provides a wire diameter greater than about 0.002" (0.05 mm) in diameter.

\* \* \* \* \*